United States Patent
Izzi et al.

(10) Patent No.: US 12,112,065 B2
(45) Date of Patent: Oct. 8, 2024

(54) TECHNIQUES FOR DETECTION OF SHUTDOWN PATTERNS

(71) Applicant: Micron Technology, Inc., Boise, ID (US)

(72) Inventors: Roberto Izzi, Caserta (IT); Luca Porzio, Casalnuovo (IT); Marco Onorato, Villasanta (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/752,354

(22) Filed: May 24, 2022

(65) Prior Publication Data
US 2023/0384972 A1 Nov. 30, 2023

(51) Int. Cl.
*G06F 3/06* (2006.01)
(52) U.S. Cl.
CPC .......... *G06F 3/0659* (2013.01); *G06F 3/0619* (2013.01); *G06F 3/0679* (2013.01)
(58) Field of Classification Search
CPC .... G06F 3/0659; G06F 3/0619; G06F 3/0679; G06F 3/0634; G06F 3/0644
USPC .......................................................... 711/103
See application file for complete search history.

(56) References Cited

U.S. PATENT DOCUMENTS

| 2018/0069978 A1* | 3/2018 | Iwabuchi | G06F 3/1267 |
| 2020/0021185 A1* | 1/2020 | Yamamura | H02M 1/08 |
| 2020/0057728 A1* | 2/2020 | Koo | G06F 1/30 |

* cited by examiner

*Primary Examiner* — Hua J Song
(74) *Attorney, Agent, or Firm* — Holland & Hart LLP

(57) ABSTRACT

Methods, systems, and devices for techniques for detection of shutdown patterns are described. A memory device may receive a set of commands from a host device. The memory device may determine whether the set of commands are associated with a shutdown procedure based on a pattern of the received set of commands. The memory device may initiate one or more operations associated with the shutdown procedure based on identifying that the set of commands are associated with the shutdown procedure. The memory device may receive a shutdown command for the shutdown procedure after initiating the one or more operations associated with the shutdown procedure. The memory device may determine that the set of commands are associated with the shutdown procedure based on a quantity of the set of commands, one or more types of the set of commands, other thresholds associated with the pattern, or a combination thereof.

23 Claims, 6 Drawing Sheets

TECHNIQUES FOR DETECTION OF SHUTDOWN PATTERNS

FIELD OF TECHNOLOGY

The following relates to one or more systems for memory, including techniques for detection of shutdown patterns.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
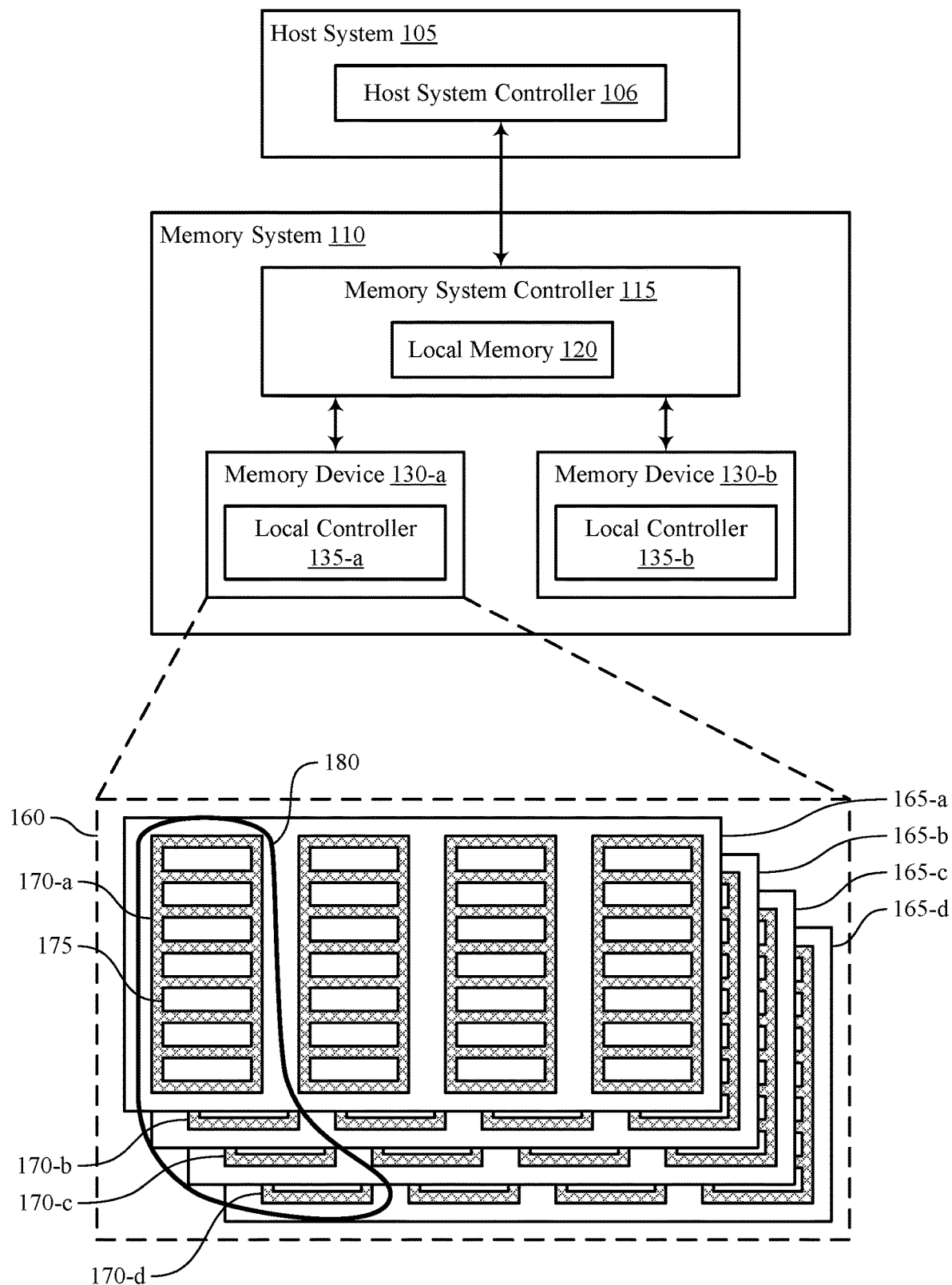
FIG. 1 illustrates an example of a system that supports techniques for detection of shutdown patterns in accordance with examples as disclosed herein.

A host device and a memory device (e.g., a managed NAND (MNAND) device) may support various commands associated with storage operations. For example, the host device may issue a command to a memory device to adjust a power state of the memory device (e.g., a command to power on or power off). For example, the host device may send a command for a shutdown procedure (e.g., a procedure to power off the memory device). In some examples, the memory device may perform operations associated with the shutdown procedure in response to receiving the command. As an illustrative example, the host device may issue a start stop unit (SSU) command to the memory device indicating to perform a shutdown procedure, and the memory device may perform one or more operations associated with the SSU (e.g., a firmware (FW) table flush, a FW structure flush, a cache flush, power management operations, etc.). In some cases, such operations may consume time subsequent to the SSU command, during which the memory device may draw power to perform the operations. In addition, other operations may depend on completion of the operations associated with the SSU.

The techniques described herein may enable a memory device to identify a shutdown procedure and initiate one or more operations associated with the shutdown procedure prior to receiving a command for the shutdown procedure, which may result in reduced latency and power consumption, among other benefits. For example, a memory device may receive a set of commands from a host device that may be associated with a shutdown procedure for the memory device. The memory device may identify a pattern of the set of commands (e.g., an order, quantity, grouping, type, threshold satisfaction, or any combination thereof of the set of commands). The memory device may determine that the pattern is associated with a sequence of commands that precede a command for the shutdown procedure. Thus, the memory device may initiate one or more operations associated with the shutdown procedure prior to receiving the command for the shutdown procedure.

As an illustrative example, a memory device may receive a set of commands and determine that the set of commands is associated with a pattern of commands that precede a shutdown procedure (e.g., one or more commands associated with unmounting one or more partitions of the memory device, such as synchronize cache commands as described herein). Stated alternatively, the memory device may predict that a command to initiate a shutdown procedure is likely to be sent from the host device after the pattern of commands. The memory device may initiate one or more operations associated with the predicted shutdown procedure in response to such pattern identification. In some examples, identifying the pattern of the received commands may include comparing a quantity of the commands to a threshold quantity of commands associated with a pattern. If the quantity and/or type of the received commands satisfy the threshold, the memory device may initiate some shutdown operations prior to receiving the shutdown command. In some examples, if a command that is not a part of the pattern is received after the operations are initiated, the memory device may abort the operations. Otherwise, the memory device may receive a shutdown command and perform the shutdown procedure (e.g., finalize the one or more initiated operations, perform other operations, or both).

Figure 2:
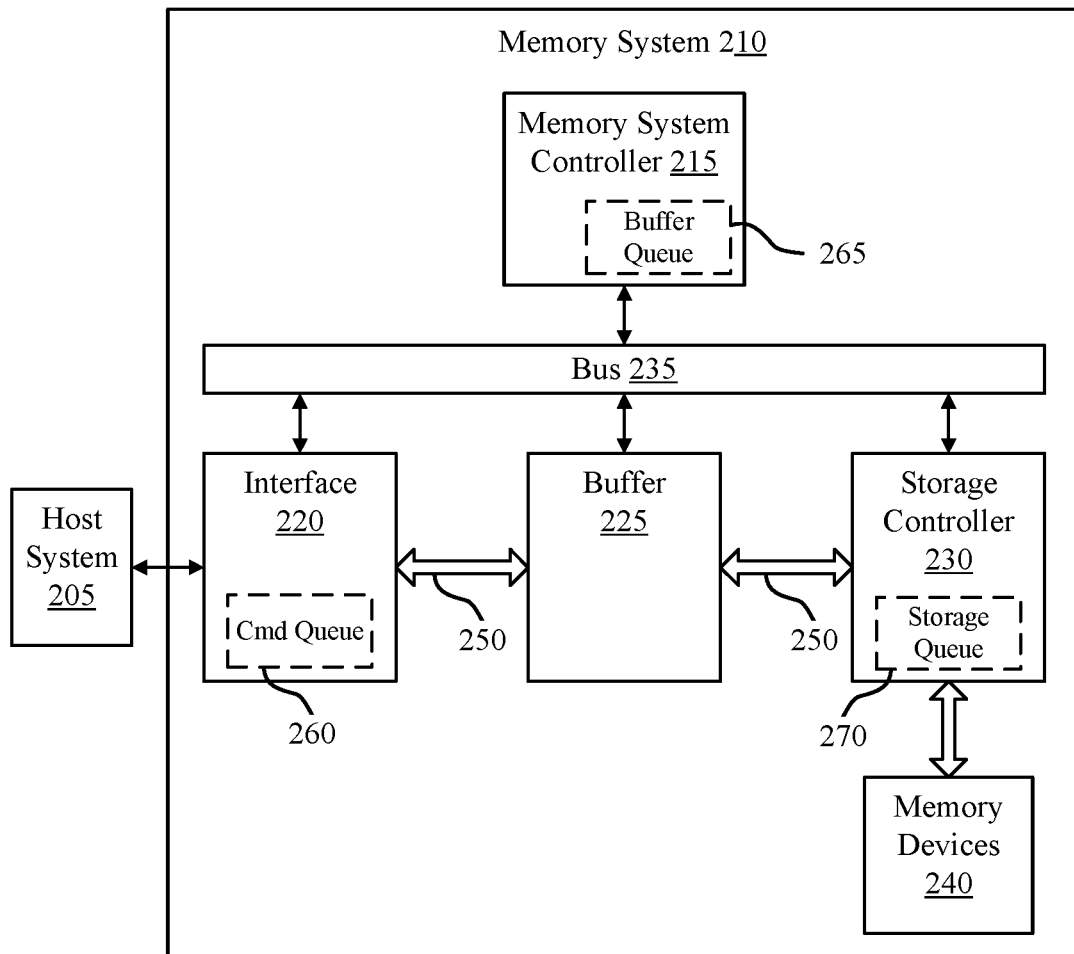
FIG. 2 illustrates an example of a system that supports techniques for detection of shutdown patterns in accordance with examples as disclosed herein.
Figure 3:
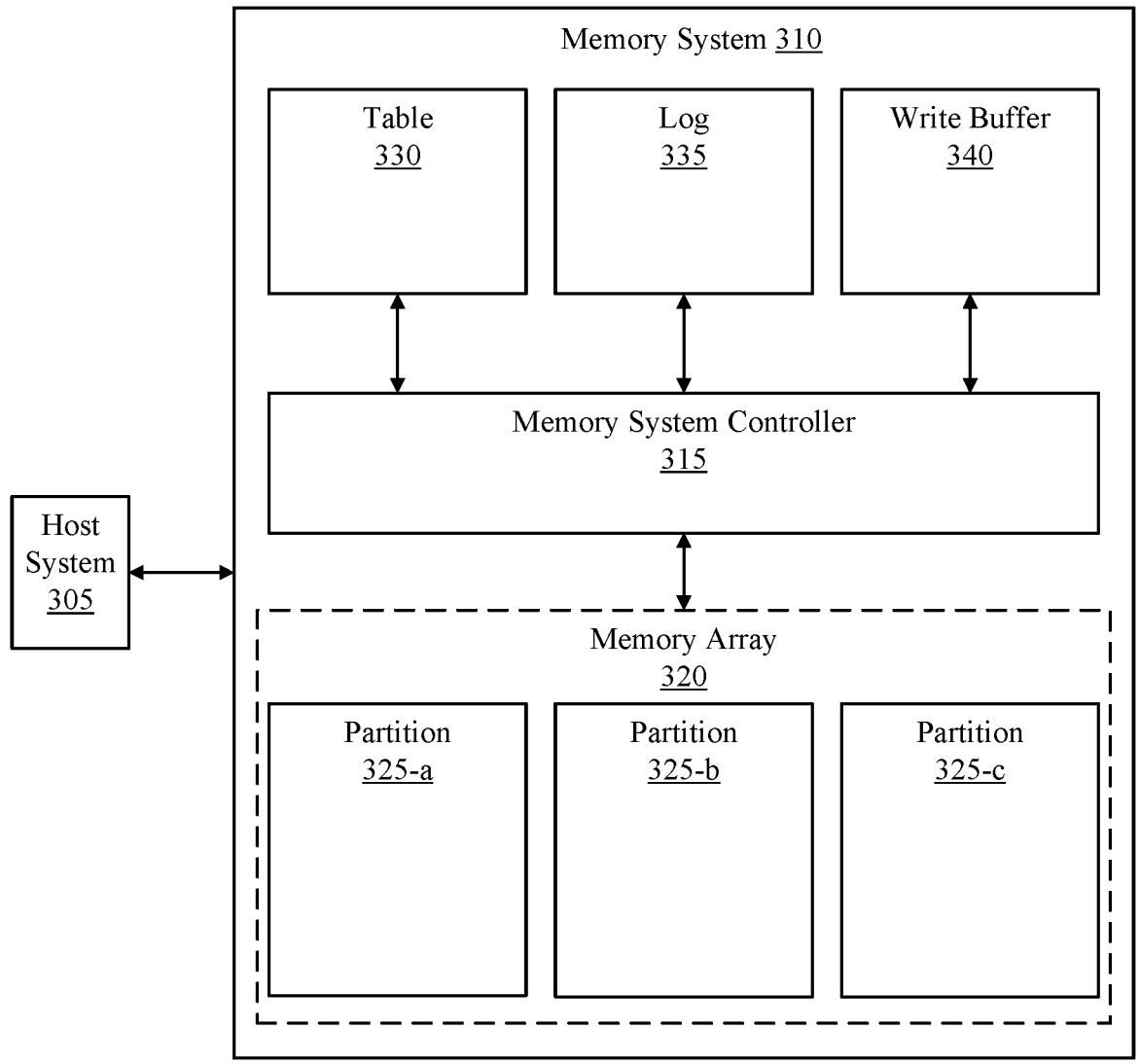
FIG. 3 illustrates an example of a system that supports techniques for detection of shutdown patterns in accordance with examples as disclosed herein.

Features of the disclosure are initially described in the context of systems and devices with reference to FIGS. 1-3. Features of the disclosure are described in the context of a process flow with reference to FIG. 4. These and other features of the disclosure are further illustrated by and described in the context of an apparatus diagram and flowchart that relate to techniques for detection of shutdown patterns with reference to FIGS. 5-6.

FIG. 1 illustrates an example of a system 100 that supports techniques for detection of shutdown patterns in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support techniques for detection of shutdown patterns. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the techniques described herein may enable a memory system 110 to identify a shutdown procedure and initiate one or more operations associated with the shutdown procedure prior to receiving a shutdown command. This may result in reduced latency and power consumption, among other benefits. For example, the memory system 110 may receive a set of commands from the host system 105 that may be associated with a shutdown procedure (e.g., may precede a shutdown command) for the memory system 110. The memory system 110 may identify a pattern of the set of commands. The memory system 110 may initiate one or more operations in response to the pattern (e.g., the pattern may be a quantity and/or type of commands that the host system 105 may issue before issuing a command to initiate a shutdown procedure). Stated alternatively, the memory system 110 may utilize the pattern detection techniques to predict that the shutdown command is likely to be imminent. Thus, the memory system 100 may preemptively prepare for the shutdown procedure (e.g., shut down device peripherals, flush tables, and the like) prior to receiving the shutdown command, which may result in reduced latency and/or power consumption of the shutdown procedure, among other benefits.

FIG. 2 illustrates an example of a system 200 that supports techniques for detection of shutdown patterns in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the techniques described herein may enable a memory system 210 to identify a shutdown procedure and initiate one or more operations associated with the shutdown procedure prior to receiving a shutdown command. This may result in reduced latency and power consumption, among other benefits. For example, the memory system 210 may receive a set of commands from the host system 205. The set of commands may be associated with a shutdown procedure to be performed by the memory system 210. The memory system 210 may identify a pattern (e.g., an order of the set of commands, a quantity of the set of commands, a grouping of the set of commands, a type of each of the set of commands, or any combination thereof). The memory system 210 may initiate one or more operations in response to the identified pattern. As an illustrative example, a memory system 210 may receive a set of commands and determine that the set of commands is associated with a pattern of commands preceding a shutdown procedure (e.g., the memory system 210 may be preconfigured with the pattern or otherwise be configured to learn the pattern from previous shutdown procedures). Based on identifying the pattern, the memory system 210 may initiate one or more operations associated with the shutdown procedure prior to receiving a command to initiate the shutdown procedure from the host system 205.

As an illustrative example, the memory system 210 may receive multiple consecutive synchronize cache commands and determine that a threshold quantity (e.g., a threshold of up to six synchronize cache commands associated with six partitions of the memory system 210) is satisfied, although any quantity or type of commands may be used. Thus, the memory system 210 may initiate one or more operations associated with the shutdown procedure in response to the satisfied threshold (e.g., prior to receiving a command for the shutdown procedure). Such operations may include power management operations (e.g., turning off peripherals of the memory system 210), a table flush operation, a structure flush operation, a write buffer flush operation, a checkpoint operation, a parity flush operation, or any combination thereof, among other examples of operations.

FIG. 3 illustrates an example of a system 300 that supports techniques for detection of shutdown patterns in accordance with examples as disclosed herein. The system 300 may be an example of or implement aspects of a system 100 as described with reference to FIG. 1 or a system 200 as described with reference to FIG. 2. For example, the memory system 310 and the host system 305 may be examples of the memory system 110 and 210 and the host system 105 and 205, respectively.

The system 300 may include a host system 305 and a memory system 310. The memory system 310 may include a memory system controller 315, a memory array 320, partitions 325, a table 330, a log 335, and a write buffer 340, which may be examples of or implement aspects of components as described herein with reference to FIGS. 1 and 2. Although illustrated as separate for illustrative clarity, it is to be understood that the system 300 may include components that are combined, arranged in different locations or orientations, or a combination thereof. Additionally or alternatively, the system 300 may have additional types or quantities of components, and/or some components may be absent from the system 300. In some examples, operations described as being included or performed at one component or system may additionally or alternatively be performed at another component or system.

The memory system controller 315 may be an example of the memory system controller 115 as described with reference to FIG. 1, or an example of the memory system controller 215 as described with reference to FIG. 2. For example, the memory system controller 315 may be operable to execute commands received from the host system 305, control the data path components in the moving of data, and the like, as described herein with reference to FIGS. 1 and 2.

In the example of the system 300, the memory system 310 may include a table 330, a log 335, and a write buffer 340, which may be examples of blocks, buffers, or other components as described herein. For example, the table 330 may be a portion of memory (e.g., the memory array 320 or other memory) that stores information for the memory system 310, such as a logical to physical (L2P) mapping table, a data table, and the like, though any table may be used. For example, the table 330 may be an L2P table including the logical to physical mapping of physical blocks to logical blocks, or a table which indicates the physical blocks associated with a virtual block (e.g., the memory system 310 may receive an access command from the host system 305 indicating a logical address, and the memory system 310 may use the table 330 to identify the physical location for performing the access operation). The log 335 may be memory associated with logging (e.g., storing a record or list) of operations, commands, timestamps, or other data from the host system 305 or the memory system 310 or both. The write buffer 340 may be an example of a buffer 225 as described herein. For example, data associated with write operations may be buffered in the write buffer 340.

The memory system 310 may additionally include a memory array 320, which may be an example of a memory array as described with reference to FIGS. 1 and 2 (e.g., the memory array 320 may be written to store data or stored data may be read from the memory array 320 in response to access commands from the host system 305. The memory array 320 may be an example of NAND memory, flash memory, PCM, self-selecting memory, 3D cross point, other chalcogenide-based memories, FERAM, MRAM, NOR (e.g., NOR flash) memory, STT-MRAM, CBRAM, RRAM, OxRAM, or any combination thereof, though any type or quantity of memory may be used.

The memory array 320 may include one or more partitions 325. A partition may be a portion of the memory array 320 (e.g., the host system 305 may partition or section the memory array 320 into each partition 325 for use by various processes and programs). As an illustrative example, a partition 325 may refer to an assignment of a portion of the memory array 320 (e.g., blocks or other portions as described with reference to FIGS. 1 and 2) to a group made by the host system 305. In some examples, a partition 325 may be an example of a logical unit number (LUN), which may be an identifier for designating an individual or collection of physical or virtual storage devices that execute input/output (I/O) commands from the host system 305, though any type of partition may be used. The host system 305 may assign, reassign, or associate memory cells to various partitions in response to some criteria (e.g., assigning a quantity of memory cells to a partition for storing user data, such as data used in access operations, firmware data, etc.). The host system 305 may use the partitions 325 to identify subsets of data in a memory system 310 to execute operations. As an illustrative example, the memory array 320 as shown in FIG. 3 may include a first partition 325-$a$, a second partition 325-$b$, and a third partition 325-$c$, although the memory array 320 may include any quantity or type of partitions. As a merely illustrative example, the partition 325-$a$ may be designated for user data and operations, the partition 325-$b$ may be designated for storage capacity, and the partition 325-$c$ may be designated for firmware operations, or other purposes indicated by the host system 305.

As an illustrative example, the host system 305 may partition the memory array 320 into a quantity of LUNs, such as 3 LUNs as shown in FIG. 3, 4 LUNs, 5 LUNs, 6 LUNs, or any quantity of LUNs. The host system 305 may issue commands to mount such a quantity of the LUNs using one or more modules (e.g., such as a Filesystem). In an example with a quantity of LUNs equal to 6, the host system 305 may utilize a module such as a Filesystem module to mount block devices. For example, a list of 6 LUNs may be mounted as: LUN0→/dev/block/sda, LUN1→/dev/block/sdb, LUN2→/dev/block/sdc, LUN3→/dev/block/sdd, LUN4→/dev/block/sde, LUN5→/dev/block/sdf. In some examples, the host system 305 may mount such partitions 325 during a power up of the memory system 310.

In some examples, the system 300 may support various power states (e.g., power modes). For example, the host system 305 may transmit one or more commands indicating for the memory system 310 to switch from one power mode to another (e.g., an active power mode, a sleep power mode, or a power down power mode). Within one or more states, there may be subsequent commands issued from the host system 305 that enable operations to be performed by the memory system 310. In some examples, the host system 305 may transmit one or more commands to the memory system 310 that indicate to the memory system 310 to enter a boot phase. For example, during a memory system boot phase, subsequent commands or operations may be initiated, including partitioning of the memory array 320, mounting (e.g., the host system may command the memory system to mount a quantity of LUNs, such as partitions 325 as previously described), or other operations and commands. A boot phase may additionally or alternatively be referred to as or associated with a power on phase, a startup phase, and the like.

In some examples, the host system 305 may issue commands with one or more fields (e.g., an IMMED field, a number (No) flush field, a power condition field, a start field, a LUN or WLUN field, or any combination thereof). Such fields may indicate a partition 325 associated with the command, a power condition for the memory system 310 to transition to, one or more operations for the memory system 310 to perform, and the like.

As illustrative examples, a host system 305 may issue a command with an IMMED field of 0, which may result in a response being sent after a change is complete (e.g., a response from a memory system 310 to the host system 305 after a change from one power state to another is complete). The host system 305 may issue a command with an IMMED field of 1, which may result in a response being sent after a command is decoded (e.g., memory system 310 sends a response immediately after decoding the command from the host system 305). The host system 305 may issue a command with a No Flush field of 0, which may result in dynamic data being flushed to non-volatile storage. The host system 305 may issue a command with a No Flush field of 1, which may indicate that the host system 305 has no instructions or commands regarding dynamic data. The host system 305 may issue a command with a power condition of 0h and a start field of 0, where the LUN or WLUN field may be 00h to N-1[(1)], and the LUN Field in UPIU (e.g., a packet based on a standard may be referred to as a UPIU) may be 00h to N-1[(1)], which may result in the memory system 310 action to stop the designated logical unit (LU) (e.g., LUN). The host system 305 may issue a command with a power condition of 0h, and a start field of 1, where the LUN or WLUN field may be 00h to N-1[(1)], and the LUN Field in UPIU may be 00h to N-1[(1)], which may result in the memory system 310 action to start the designated LU.

In some examples, the commands may initiate a power transition procedure, such as a shutdown procedure (e.g., to a power down power mode), a startup procedure (e.g., to an active power mode), or a sleep procedure (e.g., to a sleep power mode). For example, the host system 305 may issue a power command, such as a command with a power condition indication (e.g., a power indication field indicating to transition to an indicated power mode). That is, the command may include an indicator of a power mode (e.g., a start stop unit (SSU) command to shut down, sleep, or start up the memory system 310 may include a power indicator of the respective power mode). As illustrative examples, the host system 305 may issue a command with a power condition of 1h, and a start condition of 0, where the LUN or WLUN field may be 50h' and the LUN Field in UPIU may be D0h (e.g., LUN fields corresponding to each of the LUNs within the memory system 310), which may result in the memory system to transition to an active power mode (e.g., initiate a startup or power on procedure). The host system 305 may issue a command with a power condition of 2h, and a start condition of 0, where the LUN or WLUN field may be 50h' and the LUN Field in UPIU may be D0h, which may result in the memory system 310 transitioning to a sleep power mode. The host system 305 may issue a shutdown command with a power condition of 3h, and a start condition of 0, where the LUN or WLUN field may be 50h' and the LUN Field in UPIU may be D0h, which may result in the memory system transitioning to a power down mode (e.g., the memory system 310 may initiate operations associated with a shutdown procedure in response to the power down command).

However, in some examples such commands may result in relatively high power consumption or latency. For example, the memory system 310 may perform relatively time consuming or power intensive operations in response to the shutdown procedure. For instance, in the case of an SSU command (e.g., commands as described herein), there may be some in house operations that the memory system 310 performs (e.g., FW table flush, FW structure flash, power management operations, or other time consuming operations) that may increase the latency of the SSU command (e.g., a shutdown command to initiate a shutdown procedure). In accordance with the techniques described herein, the memory system 310 may be operable to initiate one or more operations of the shutdown procedure prior to receiving a command to initiate the shutdown procedure (e.g., in response to identifying a pattern of commands preceding the power down command with a power condition indicator of 3h), which may result in reduced latency for shutdown procedures, improved power efficiency, and the like. Stated alternatively, the memory system 310 may be enabled to recognize a shutdown power management pattern and take action on time (e.g., prior to receiving the command for the shutdown procedure). That is, by detecting a specific power management pattern (e.g., pattern of commands from the host system 305), the memory system 310 may identify an upcoming shutdown request before receiving the corresponding SSU command, and thus the memory system 310 may predict or preemptively initiate some operations.

For example, the memory system 310 may receive a set of commands from the host system 305. The memory system 310 may identify that the set of commands is associated with a pattern of commands that precedes a command to initiate a shutdown procedure (e.g., a set of commands may include one or more commands associated with unmounting a quantity of LUNs, one or more commands to flush contents of a volatile cache, or a combination thereof, such as a synchronization cache command for each LUN). In response to determining that the set of commands matches such a pattern or a start of such a pattern, the memory system 310 may predict an incoming shutdown command from the host system 305 (e.g., the memory system 310 may determine after receiving one or more synchronize cache commands that the commands are a part of the pattern of commands issued from the host system 305 to unmount each of the LUNs before a SSU command to initiate the shutdown procedure).

In response to determining that a set of commands corresponds to the pattern, the memory system may determine to initiate one or more operations associated with the shutdown procedure prior to receiving the shutdown command. For example, the memory system 310 may begin cache flush operations or other operations associated with unmounting each partition 325, a table flush operation (e.g., emptying of data stored within the table 330), a structure flush operation (e.g., flushing global firmware variables, flushing the change log, flushing status of internal firmware variables, flushing firmware status and the like), a write buffer flush operation (e.g., clearing any information stored in the write buffer 340), a checkpoint operation (e.g., saving data or creating a marker to identify where to begin or resume a process upon powering up the device), a parity flush operation (e.g., flushing parity information from one or more buffers, caches, or other memory portions), a flag set operation, a log save operation (saving or flushing data within the log 335), power management operations (e.g., turning off peripheral components of the memory system 310 or other power management operations for shutting down the memory system 310) or any combination thereof, among other examples of operations. In some examples, the power management operations may include shutting down one or more power domains (e.g., power domains of the memory system controller CPU to the NAND, power domains of the retention RAM, and the like, among other examples of peripheral components). In some examples, operations that may be carried out by the firmware after detecting a power down pattern of commands (e.g., prior to an SSU command with a power condition of 3 indicating a shutdown) may include the write buffer flush operation, a checkpoint operation (e.g., flush change log tables for host, garbage collection, unmap procedures, and the like, which may be relatively time consuming), flush a redundant array of independent nodes (RAIN) parity, and the like (e.g., the firmware may switch off the retention RAM to save power, among other examples of power management operations). In some examples, operations that may be performed after an SSU is received (e.g., for the firmware to complete the shutdown procedure) may include setting a power off notification (PON) flag, flushing system information and save logs, and powering down of the device.

As an illustrative example, before issuing a shutdown command (e.g., and SSU command), the host system 305 may issue commands to unmount each of, or a quantity of the LUNs using one or more modules (e.g., such as a Filesystem). In some examples, the host system 305 may utilize a module such as a Filesystem module to unmount block devices (e.g., the LUNs). The host system 305 may also issue commands to flush caches or synchronize caches associated with each partition 325 (e.g., each LUN). For example, before shutdown, a host system 305 may transmit flush commands to each block device (e.g., flushing the content of the volatile cache), transmit synchronize cache commands to each block device (e.g., ensuring cached data is synchronized between the host system and the memory system), and/or transmit commands to unmount each block device or partition prior to transmitting a shutdown command.

As an illustrative example of a sequence or pattern of commands that may precede a shutdown procedure, the memory system 310 may receive the following set of commands. For example, the memory system 310 may be configured with 6 partitions (e.g., LUNs). Prior to the pattern associated with a shutdown procedure, at t1 (e.g., a first timestamp), the memory system 310 may perform a read operation at LUN 0x0 (e.g., partition 325-a). At t2, the memory system 310 may transmit a read response for the LUN 0x0. At t3, the host system 305 may transmit a read operation request to the LUN 0x0, addressing Logical Block 0x2E65. The memory system 310 may perform the read operation at LUN 0x0 at t4 and transmit a read response at t5. At t6, the host system 305 may transmit a read operation request to the LUN 0x0, addressing Logical Block 0x2E66. The memory system 310 may perform the read operation at LUN 0x0 at t8 and transmit a read response at t9. At t10, the host system 305 may transmit a read operation request to the LUN 0x0, addressing Logical Block 0x2E67. The memory system 310 may perform the read operation at LUN 0x0 at t11 and transmit a read response at t12.

As an example of a pattern of commands that may be associated with a shutdown procedure, at t13, the host system 305 may transmit a synchronize cache command to the LUN 0x0, addressing logical block 0x0. At t14 the memory system 310 may transmit a response to the synchronize cache command. At t15 seconds, the host system 305 may transmit a synchronize cache command to the LUN 0x1, addressing logical block 0x0. At t16 the memory system 310 may transmit a response to the synchronize cache command. At t17, the host system 305 may transmit a synchronize cache command to the LUN 0x2, addressing logical block 0x0. At t18 the memory system 310 may transmit a response to the synchronize cache command. At t19, the host system 305 may transmit a synchronize cache command to the LUN 0x3, addressing logical block 0x0. At t20 the memory system 310 may transmit a response to the synchronize cache command. At t21, the host system 305 may transmit a synchronize cache command to the LUN 0x4, addressing logical block 0x0. At t22 the memory system 310 may transmit a response to the synchronize cache command. At t23, the host system 305 may transmit a synchronize cache command to the LUN 0x5, addressing logical block 0x0. At t24 the memory system 310 may transmit a response to the synchronize cache command.

Thus, in this illustrative example, the pattern or sequence of commands may include six synchronize cache commands, each corresponding to a respective LUN of the 6 LUNs. After receiving this set of 6 consecutive synchronize cache commands, at t25 seconds, the host system 305 may transmit an SSU command to the LUN 0xD0, with a power state of 0x3. At t26 the memory system 310 may transmit a response to the SSU command and/or shutdown in response to the SSU command.

Further, as described herein, the memory system 310 may initiate one or more operations of the shutdown procedure prior to the SSU command in response to identifying the pattern of synchronize cache commands (e.g., after the first synchronize cache command at t13, the second synchronize cache command at t15, etc., until a threshold quantity of the command type is satisfied, which may be one, two, or a command for each LUN). Additionally or alternatively, the memory system 310 may identify other examples of patterns, such as a set of consecutive commands (e.g., command types with no other commands in between each command), some set or subset of commands (e.g., commands different than read or write commands that move data within the memory system 310, commands different than commands resulting in table or log entries, or other examples of commands that indicate the commands are not associated with a shutdown procedure).

Figure 4:
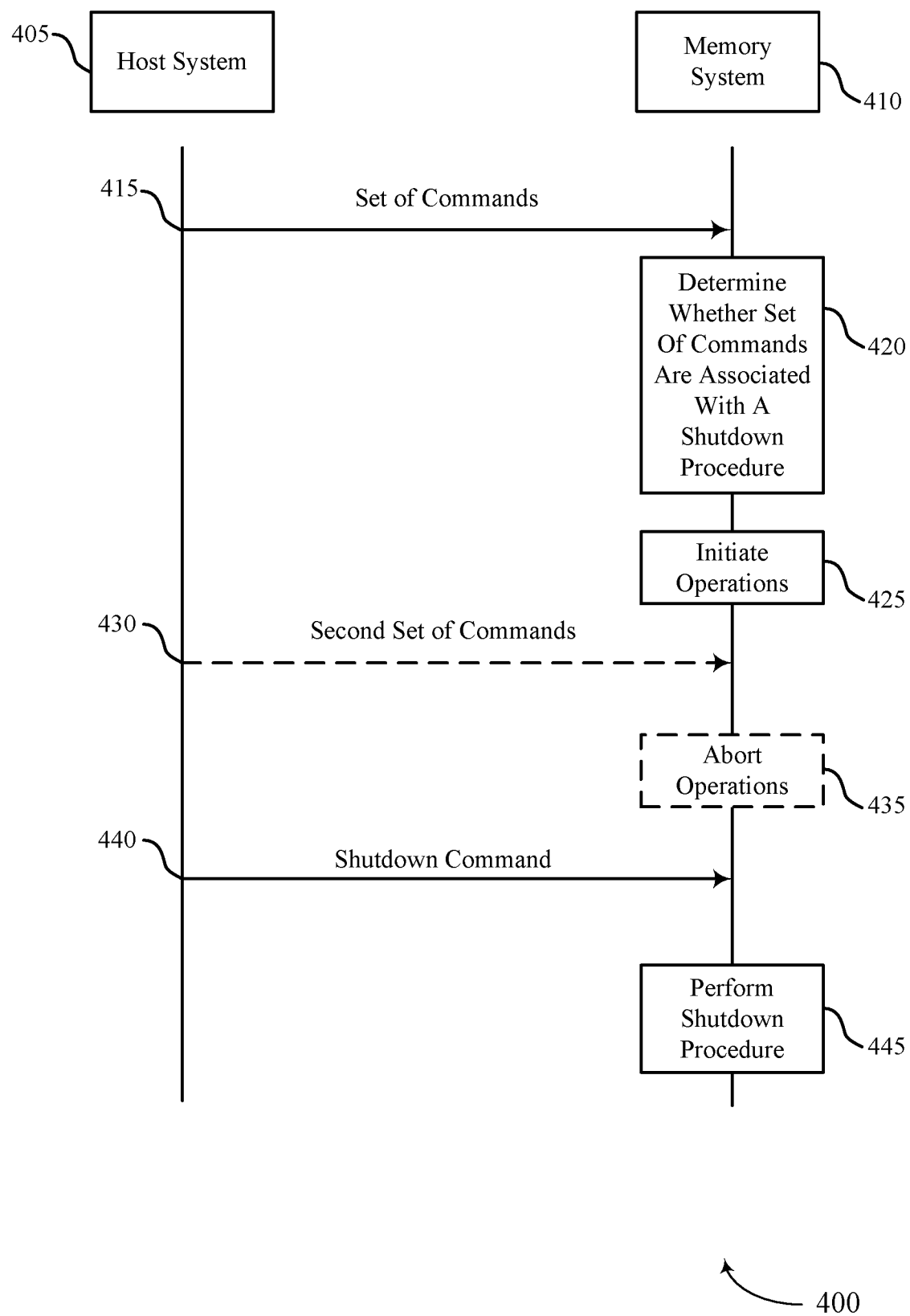
FIG. 4 illustrates an example of a process flow that supports techniques for detection of shutdown patterns in accordance with examples as disclosed herein.

FIG. 4 illustrates an example of a process flow 400 that supports a techniques for detection of shutdown patterns in accordance with examples as disclosed herein. The process flow 400 may be an example of an order of operations performed by the host system 405 and memory system 410. The process flow 400 may implement or be implemented by aspects of the systems 100, 200, or 300 as described with reference to FIGS. 1-3. For example, the memory system 410 and the host system 405 may be examples of the memory system 110, 210, or 310 and the host system 105, 205, or 305, respectively. In the following description of the process flow 400, the operations of the host system 405 and memory system 410 may be performed in a different order than the example order shown, or the operations performed by the host system 405 and memory system 410 may be performed in different orders or at different times. Some operations may also be omitted from the process flow 400, and other operations may be added to the process flow 400.

At 415, a set of commands may be communicated. For example, the host system 405 may transmit a set of commands to the memory system 410. The memory system 410 may receive and process the set of commands. The set of commands may be an example of one or more commands as described herein with reference to FIGS. 1-3. For example, the set of commands may include access commands (e.g., read commands, write commands), such as access commands as described with reference to FIG. 2. In some additional or alternative examples, the set of commands may include commands associated with unmounting a partition, such as synchronization commands (e.g., synchronize cache commands, synchronize table commands) as described with reference to FIG. 3 (e.g., the memory system 410 may verify that data stored in a cache associated with a partition matches data assigned to be stored in the partition by the host system 405). Additionally or alternatively, the set of commands may include flush commands (e.g., flush cache commands, which may include a command by the host to clear or empty a cache of a partition), power management commands (e.g., shutdown commands, SSU commands with various power condition parameters such as the power condition indicators as described in FIG. 3), commands associated with mounting or unmounting one or more partitions as described with reference to FIG. 3, or any combination thereof, among other examples of commands.

The set of commands may correspond to a pattern as described herein with reference to FIGS. 1-3. For example, the pattern may refer to a sequence of commands that precede a shutdown command to initiate a shutdown procedure. The memory system 410 may be pre-configured with one or more patterns, the memory system 410 may be configured to learn such a pattern from previous shutdown procedures (e.g., the memory system 410 may receive a second set of commands prior to a previous shutdown procedure and log, record, or otherwise identify the pattern in response to an order of the second set of commands, command types of the second set of commands, and the like). In some examples, the set of commands may include each command of the sequence of commands of the pattern or a subset (e.g., one or more) of the sequence of commands belonging to the pattern.

In some examples, the set of commands may be an example of commands associated with unmounting a set of partitions as described herein. For example, prior to a shutdown command (e.g., an SSU command with a power condition parameter of 3h indicating to transition to a shutdown power mode), the host system 405 may send one or more commands associated with each partition (e.g., synchronize cache commands), and the memory system 410 may unmount each partition (e.g., each LUN) and/or flush contents of a volatile cache associated with a respective partition in response to the one or more commands. For example, the memory system 410 may include 6 partitions and the host system 405 may send 6 respective synchronize cache commands, although any type or quantity of commands or partitions may be used. As an example of commands associated with a pattern as described herein, the set of commands may be a set of consecutive commands with a threshold command type (e.g., a quantity of commands with a type as described herein, such as commands that do not include commands resulting in data being moved or table or lag entries being added, among other examples of commands not associated with a pattern preceding a shutdown command).

At 420, it may be determined whether the set of commands are associated with a shutdown procedure. For example, the memory system 410 may determine whether the set of commands are associated with a shutdown procedure. In some examples, the memory system 410 may determine that one or more thresholds associated with a pattern are not satisfied (e.g., the set of commands are not associated with the shutdown procedure) and continue regular operations (e.g., refrain from initiating operations of a shutdown procedure). In some other examples, the memory system may determine that the one or more thresholds are satisfied (e.g., the set of commands are associated with the shutdown procedure). For example, the memory system 410 may determine whether the set of commands include at least a portion of the sequence of commands (e.g., the pattern of commands) that precede a shutdown command. Stated alternatively, the set of commands may have a pattern (e.g., a quantity of commands that satisfies a threshold, one or more command types that satisfy a threshold) that matches the shutdown pattern or a portion of the shutdown pattern. Such a pattern may indicate that the set of commands are associated with an upcoming shutdown procedure (e.g., a shutdown command may follow the set of commands).

Additionally or alternatively, the memory system 410 may compare a quantity of commands within the set of commands to a threshold quantity of commands, among other examples of thresholds as described herein. The memory system 410 may determine that the commands are associated with a shutdown command (an expected shutdown command) in response to the satisfied one or more thresholds. For example, the memory system 410 may receive a set of commands that includes a quantity of commands associated with unmounting partitions, such as 6 commands corresponding to 6 partitions, though any quantity or type of commands may be received. Such a set of commands may correspond to the pattern of commands that the host system 405 sends prior to sending the shutdown command to initiate the shutdown procedure at the memory system 410.

At 425, one or more operations may be initiated. For example, the memory system 410 may be configured to initiate one or more operations upon receiving a set of commands that satisfies a threshold quantity and/or type of commands associated with the pattern (e.g., after receiving a first synchronization cache command, a second synchronization cache command, or any quantity of synchronization cache commands associated with respective partitions before determining that the set of commands is associated with a shutdown procedure and initiating the one or more operations). Additional or alternative thresholds may be configured, such as receiving one or more of a particular command within a set of commands, exceeding two or more thresholds (e.g., exceeding a quantity of one type of command within a set, and receiving a quantity of a certain type of commands in a particular order, etc.). Upon identifying that one or more thresholds associated with predicting a shutdown command has been satisfied, the memory system 410 may initiate operations associated with the shutdown procedure prior to receiving a shutdown command (e.g., in response to predicting that the pattern of the set of commands indicates an upcoming shutdown command at 440).

Such operations may be examples of operations described herein with reference to FIG. 3. For example, the operations may be examples of or include table flush operations, structure flush operations, write buffer flush operations, synchronize cache operations, checkpoint operations, parity flush operations, flag set operations, log save operations, power management operations (e.g., shutting down some peripherals of the memory system 410), or any combination thereof, among other examples of operations as described herein.

In some examples, at 430 a second set of commands may be communicated. For example, the host system 405 may transmit a second set of commands to the memory system 410. In some examples, the second set of commands following the set of commands may fail to match the pattern associated with the sequence of commands that precede a shutdown command. That is, the set of commands at 415 may match a portion of a pattern (e.g., one or more synchronize cache commands followed by a shutdown command), but at 430 one or more commands that fail to match the pattern or satisfy one or more thresholds (e.g., access commands or other commands of a different type or quantity than the pattern of commands that occur before a shutdown command). The memory system 410 may determine that the command association determined at 420 was incorrect (e.g., that a pattern of the set of commands was incorrectly identified). In some such examples, at 435 the memory system 410 may abort operations that were initiated at 425. For example, the memory system 410 may abort the operations associated with preparing the memory system 410 for the shutdown procedure that were initiated in response to the pattern of the set of commands at 415, the memory system 410 may revert changes made by the operations at 425, or a combination thereof.

In some other examples, the host system 405 may complete the pattern of commands (e.g., a command for each partition associated with unmounting the respective partition) and transmit a shutdown command (e.g., an SSU command) at 440. The shutdown command 440 may include a power condition parameter (e.g., an identifier associated with a power management phase or power state, such as a sleep state or power-off state). The shutdown command may indicate to initiate a shutdown procedure as described herein.

At 445, a shutdown procedure may be performed. For example, the memory system 410 may perform or finalize a shutdown procedure in response to receiving the shutdown command. For example, the memory system 410 may have performed the operations initiated at 425, the memory system 425 may finish performing the operations initiated at 425, the memory system 425 may wait to perform some shutdown operations upon receipt of the shutdown command, or any combination thereof. For example, relatively time consuming operations may be initiated at 425 (e.g., one or more power management operations, table flush operations, structure flush operations, write buffer flush operations, checkpoint operations, parity flush operations, or any combination thereof, as described with reference to FIG. 3), but other operations may be performed to finalize the shutdown procedure after receiving the shutdown command (e.g., a flag set operation, a system information flush operation, a log save operation, a power down operation, etc., as described with reference to FIG. 3.

Thus, by predicting a shutdown command 440 in response to the pattern of the set of commands at 415, the memory system 410 may preemptively perform some operations at 425 associated with the shutdown procedure, which may result in reduced power consumption, reduced latency, or both of the shutdown procedure.

Aspects of the process flow 400 may be implemented by a controller, among other components. Additionally or alternatively, aspects of the process flow 400 may be implemented as instructions stored in memory (e.g., firmware stored in a memory coupled with the memory system 410). For example, the instructions, if executed by a controller as described herein, may cause the controller to perform the operations of the process flow 400.

Figure 5:
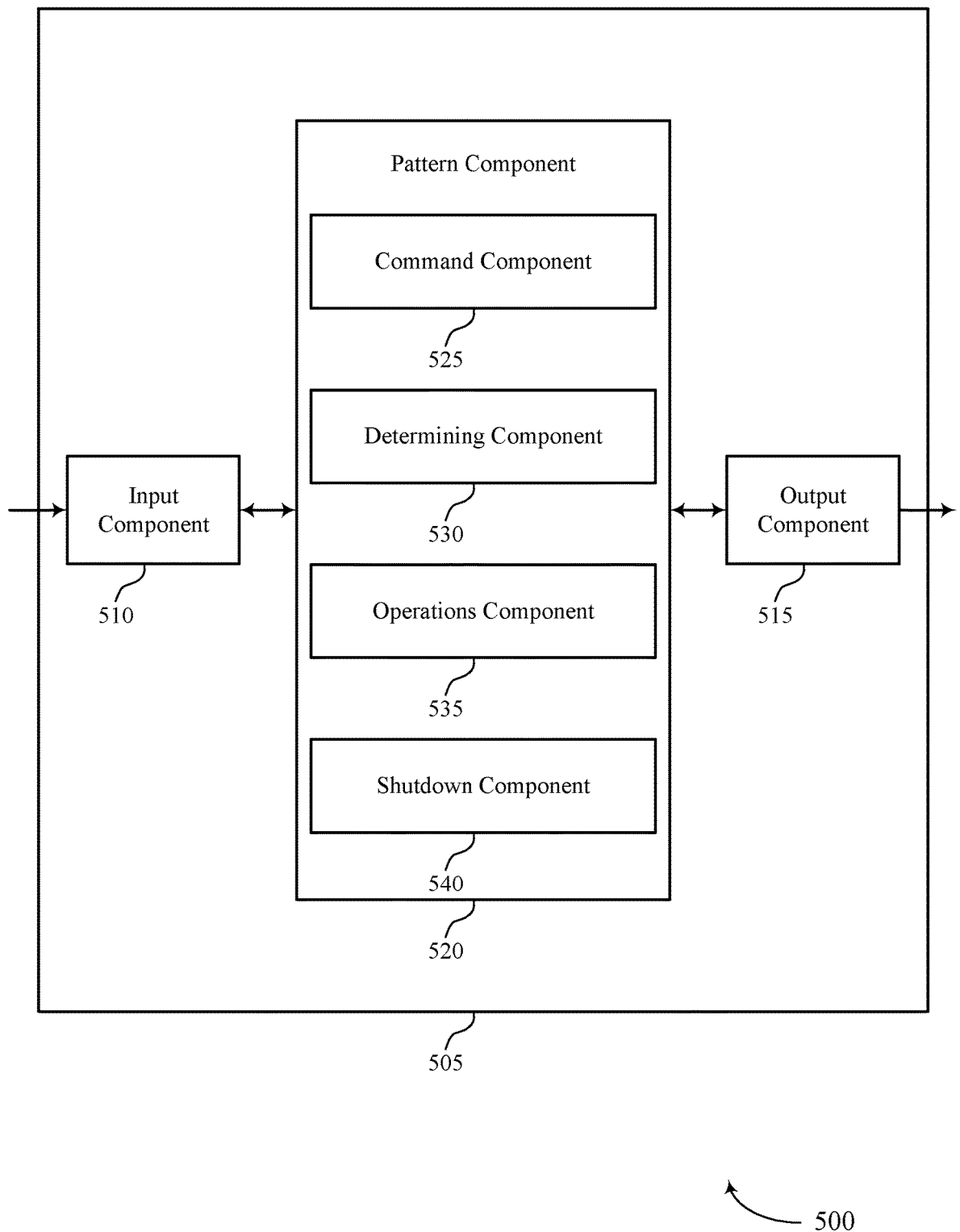
FIG. 5 illustrates a block diagram of a memory system that supports techniques for detection of shutdown patterns in accordance with examples as disclosed herein.

FIG. 5 shows a block diagram 500 of a device 505 that supports techniques for detection of shutdown patterns in accordance with examples as disclosed herein. The device 505 may include an input component 510, an output component 515, and a pattern component 520. The device 505 may also include a processor. Each of these components may be in communication with one another (e.g., via one or more buses).

The input component 510 may manage input signals for the apparatus 505. For example, the input component 510 may identify input signals in response to an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the apparatus 505 for processing. For example, the input component 510 may transmit input signals to the pattern component 520 to support techniques for detection of shutdown patterns. In some cases, the input component 510 may be a component of an I/O controller.

The output component 515 may manage output signals for the apparatus 505. For example, the output component 515 may receive signals from other components of the apparatus 505, such as the pattern component 520, and may transmit these signals to other components or devices. In some specific examples, the output component 515 may transmit output signals for display in a user interface, for storage in a database or data store, for further processing at a server or server cluster, or for any other processes at any quantity of devices or systems. In some cases, the output component 515 may be a component of an I/O controller.

For example, the pattern component 520 may include a command component 525, a determining component 530, an operations component 535, a shutdown component 540, or any combination thereof. In some examples, the pattern component 520, or various components thereof, may be configured to perform various operations (e.g., receiving, monitoring, transmitting) using or otherwise in cooperation with the input component 510, the output component 515, or both. For example, the pattern component 520 may receive information from the input component 10, send information to the output component 515, or be integrated in combination with the input component 10, the output component 515, or both to receive information, transmit information, or perform various other operations as described herein.

The command component 525 may be configured as or otherwise support a means for receiving, by a memory system, a set of commands from a host system. The determining component 530 may be configured as or otherwise support a means for determining whether the set of commands are associated with a shutdown procedure based at least in part on a pattern of the received set of commands. The operations component 535 may be configured as or otherwise support a means for initiating one or more operations associated with the shutdown procedure based at least in part on identifying that the set of commands are associated with the shutdown procedure. The shutdown component 540 may be configured as or otherwise support a means for receiving a shutdown command for the shutdown procedure after initiating the one or more operations associated with the shutdown procedure.

Figure 6:
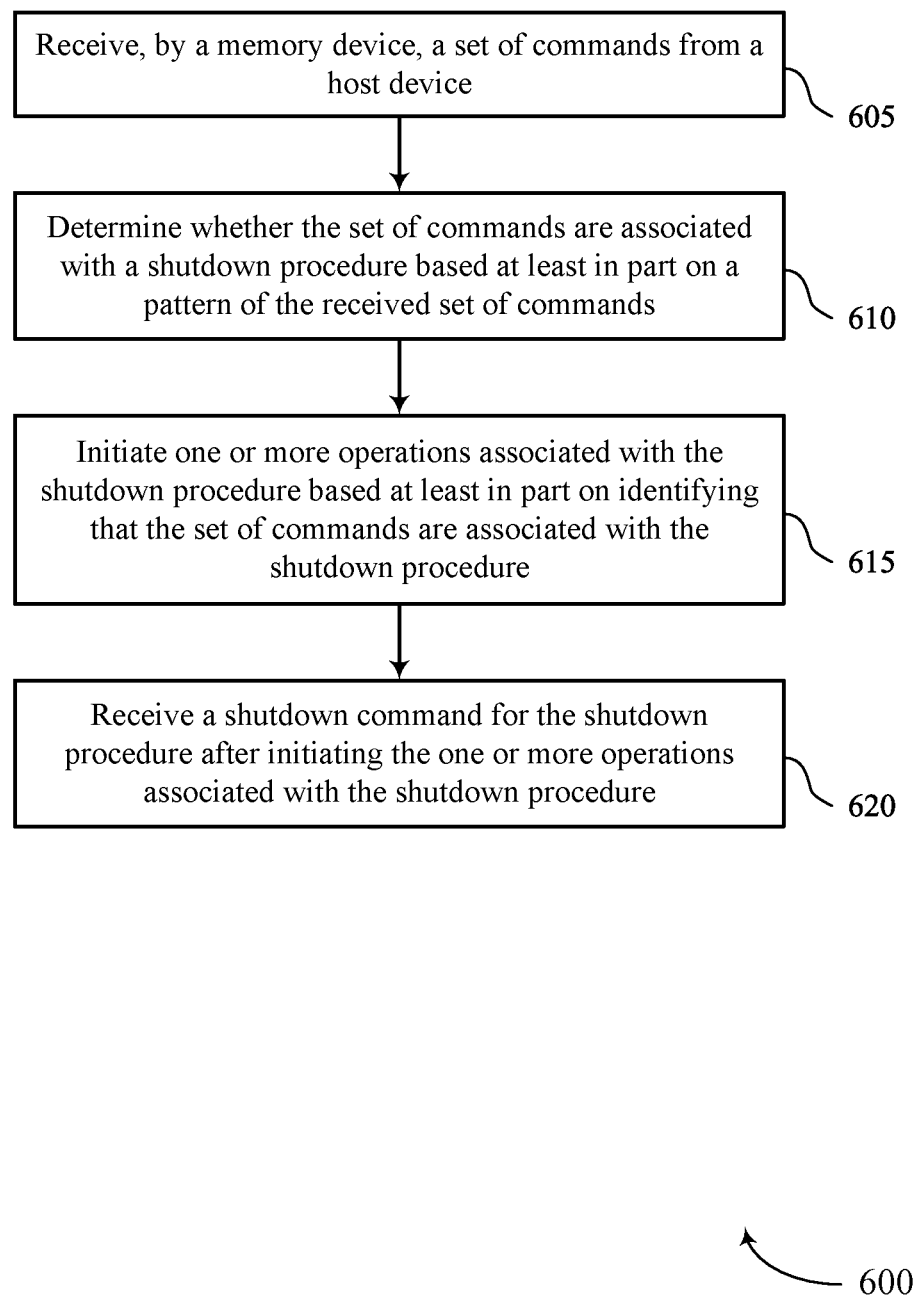
FIG. 6 illustrates a flowchart of a method that supports techniques for detection of shutdown patterns in accordance with examples as disclosed herein.

FIG. 6 shows a flowchart illustrating a method 600 that supports techniques for detection of shutdown patterns in accordance with examples as disclosed herein. The operations of method 600 may be implemented by a memory system or its components as described herein. For example, the operations of method 600 may be performed by a memory system as described with reference to FIGS. 1 through 5. In some examples, memory system may execute a set of instructions to control the functional elements of the device to perform the described functions. Additionally, or alternatively, the memory system may perform aspects of the described functions using special-purpose hardware.

At 605, the method may include receiving, by a memory system, a set of commands from a host system. The operations of 605 may be performed in accordance with examples as disclosed herein.

At 610, the method may include determining whether the set of commands are associated with a shutdown procedure based at least in part on a pattern of the received set of commands. The operations of 610 may be performed in accordance with examples as disclosed herein.

At 615, the method may include initiating one or more operations associated with the shutdown procedure based at least in part on identifying that the set of commands are associated with the shutdown procedure. The operations of 615 may be performed in accordance with examples as disclosed herein.

At 620, the method may include receiving a shutdown command for the shutdown procedure after initiating the one or more operations associated with the shutdown procedure. The operations of 620 may be performed in accordance with examples as disclosed herein.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, by a memory device, a set of commands from a host device; determining whether the set of commands are associated with a shutdown procedure based at least in part on a pattern of the received set of commands; initiating one or more operations associated with the shutdown procedure based at least in part on identifying that the set of commands are associated with the shutdown procedure; and receiving a shutdown command for the shutdown procedure after initiating the one or more operations associated with the shutdown procedure.

Aspect 2: The method, apparatus, or non-transitory computer-readable medium of aspect 1, further including operations, features, circuitry, logic, means, or instructions, or any combination thereof for determining that the set of commands are associated with the shutdown procedure is based at least in part on a quantity of the received set of commands, one or more types of the received set of commands, or a combination thereof.

Aspect 3: The method, apparatus, or non-transitory computer-readable medium of aspect 2 where the one or more types of the set of commands are associated with unmounting one or more partitions of the memory device.

Aspect 4: The method, apparatus, or non-transitory computer-readable medium of any of aspects 2 through 3 where the quantity of the received set of commands corresponds to a quantity of one or more partitions of the memory device.

Aspect 5: The method, apparatus, or non-transitory computer-readable medium of any of aspects 2 through 4 where identifying the pattern, further includes operations, features, circuitry, logic, means, or instructions, or any combination thereof for receiving a first quantity of commands of the set of commands and comparing the first quantity of commands to a threshold associated with the pattern, where determining that the set of commands are associated with the shutdown procedure is based at least in part on the first quantity of commands satisfying the threshold associated with the pattern.

Aspect 6: The method, apparatus, or non-transitory computer-readable medium of any of aspects 1 through 5, further including operations, features, circuitry, logic, means, or instructions, or any combination thereof for identifying the pattern based at least in part on a configuration of the memory device.

Aspect 7: The method, apparatus, or non-transitory computer-readable medium of any of aspects 1 through 6, further including operations, features, circuitry, logic, means, or instructions, or any combination thereof for receiving a second set of commands for a prior shutdown procedure and identifying the pattern based at least in part on a quantity of the second set of commands, one or more types of the second set of commands, or a combination thereof, where determining that the set of commands are associated with the shutdown procedure is based at least in part on identifying the pattern.

Aspect 8: The method, apparatus, or non-transitory computer-readable medium of any of aspects 1 through 7, further including operations, features, circuitry, logic, means, or instructions, or any combination thereof for performing the one or more operations associated with the shutdown procedure, the one or more operations including a table flush operation, a structure flush operation, a write buffer flush operation, a checkpoint operation, a parity flush operation, or any combination thereof.

Aspect 9: The method, apparatus, or non-transitory computer-readable medium of any of aspects 1 through 8, further including operations, features, circuitry, logic, means, or instructions, or any combination thereof for performing one or more power management operations of the one or more operations associated with the shutdown procedure.

Aspect 10: The method, apparatus, or non-transitory computer-readable medium of any of aspects 1 through 9 where the shutdown command includes a start stop unit command having a power condition parameter, the power condition parameter indicating to initiate the shutdown procedure.

Aspect 11: The method, apparatus, or non-transitory computer-readable medium of any of aspects 1 through 10, further including operations, features, circuitry, logic, means, or instructions, or any combination thereof for performing a second set of one or more operations associated with the shutdown procedure based at least in part on receiving the shutdown command.

Aspect 12: The method, apparatus, or non-transitory computer-readable medium of aspect 11 where the second set of one or more operations includes a flag set operation, a system information flush operation, a log save operation, a power down operation, or any combination thereof.

In some examples, the second set of one or more operations includes a flag set operation, a system information flush operation, a log save operation, a power down operation, or any combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   receive, by the one or more memory devices, a plurality of commands from a host device, the plurality of commands comprising a first quantity of commands;
   compare the first quantity of commands to a threshold associated with a pattern of the received plurality of commands;
   determine whether the plurality of commands are associated with a shutdown procedure based at least in part on the first quantity of commands satisfying the threshold associated with the pattern;
   initiate one or more operations associated with the shutdown procedure based at least in part on identifying that the plurality of commands are associated with the shutdown procedure; and
   receive a shutdown command for the shutdown procedure after initiating the one or more operations associated with the shutdown procedure.

2. The memory system of claim 1, wherein the processing circuitry is further configured to cause the memory system to:
   determine that the plurality of commands are associated with the shutdown procedure based at least in part on a quantity of the received plurality of commands, one or more types of the received plurality of commands, or a combination thereof.

3. The memory system of claim 2, wherein the one or more types of the plurality of commands are associated with unmounting one or more partitions of the one or more memory devices.

4. The memory system of claim 2, wherein the quantity of the received plurality of commands corresponds to a quantity of one or more partitions of the one or more memory devices.

5. The memory system of claim 1, wherein the processing circuitry is further configured to cause the memory system to:
identify the pattern based at least in part on a configuration of the one or more memory devices.

6. The memory system of claim 1, wherein the processing circuitry is further configured to cause the memory system to:
receive a second plurality of commands for a prior shutdown procedure;
and identify the pattern based at least in part on a quantity of the second plurality of commands, one or more types of the second plurality of commands, or a combination thereof, wherein determining that the plurality of commands are associated with the shutdown procedure is based at least in part on identifying the pattern.

7. The memory system of claim 1, wherein the processing circuitry is further configured to cause the memory system to:
perform the one or more operations associated with the shutdown procedure, the one or more operations comprising a table flush operation, a structure flush operation, a write buffer flush operation, a checkpoint operation, a parity flush operation, or any combination thereof.

8. The memory system of claim 1, wherein the processing circuitry is further configured to cause the memory system to:
perform one or more power management operations of the one or more operations associated with the shutdown procedure.

9. The memory system of claim 1, wherein the shutdown command comprises a start stop unit command having a power condition parameter, the power condition parameter indicating to initiate the shutdown procedure.

10. The memory system of claim 1, wherein the processing circuitry is further configured to cause the memory system to:
perform a second plurality of one or more operations associated with the shutdown procedure based at least in part on receiving the shutdown command.

11. The memory system of claim 10, wherein the second plurality of one or more operations comprises a flag plurality operation, a system information flush operation, a log save operation, a power down operation, or any combination thereof.

12. A non-transitory computer-readable medium storing code comprising instructions which, when executed by one or more processors of an electronic device, cause the electronic device to:
receive, by the electronic device, a plurality of commands from a host device, the plurality of commands comprising a first quantity of commands;
compare the first quantity of commands to a threshold associated with a pattern of the received plurality of commands;
determine whether the plurality of commands are associated with a shutdown procedure based at least in part on the first quantity of commands satisfying the threshold associated with the pattern;
initiate one or more operations associated with the shutdown procedure based at least in part on identifying that the plurality of commands are associated with the shutdown procedure; and
receive a shutdown command for the shutdown procedure after initiating the one or more operations associated with the shutdown procedure.

13. The non-transitory computer-readable medium of claim 12, wherein the instructions, when executed by the one or more processors of the electronic device, further cause the electronic device to:
determine that the plurality of commands are associated with the shutdown procedure is based at least in part on a quantity of the received plurality of commands, one or more types of the received plurality of commands, or a combination thereof.

14. The non-transitory computer-readable medium of claim 13, wherein the one or more types of the plurality of commands are associated with unmounting one or more partitions of the electronic device.

15. The non-transitory computer-readable medium of claim 13, wherein the quantity of the received plurality of commands corresponds to a quantity of one or more partitions of the electronic device.

16. The non-transitory computer-readable medium of claim 12, wherein the instructions, when executed by the one or more processors of the electronic device, further cause the electronic device to:
identify the pattern based at least in part on a configuration of the electronic device.

17. The non-transitory computer-readable medium of claim 12, wherein the instructions, when executed by the one or more processors of the electronic device, further cause the electronic device to:
receive a second plurality of commands for a prior shutdown procedure;
and identify the pattern based at least in part on a quantity of the second plurality of commands, one or more types of the second plurality of commands, or a combination thereof, wherein determining that the plurality of commands are associated with the shutdown procedure is based at least in part on identifying the pattern.

18. The non-transitory computer-readable medium of claim 12, wherein the instructions, when executed by the one or more processors of the electronic device, further cause the electronic device to:
perform the one or more operations associated with the shutdown procedure, the one or more operations comprising a table flush operation, a structure flush operation, a write buffer flush operation, a checkpoint operation, a parity flush operation, or any combination thereof.

19. The non-transitory computer-readable medium of claim 12, wherein the instructions, when executed by the one or more processors of the electronic device, further cause the electronic device to:
perform one or more power management operations of the one or more operations associated with the shutdown procedure.

20. The non-transitory computer-readable medium of claim 12, wherein the shutdown command comprises a start stop unit command having a power condition parameter, the power condition parameter indicating to initiate the shutdown procedure.

21. The non-transitory computer-readable medium of claim 12, wherein the instructions, when executed by the one or more processors of the electronic device, further cause the electronic device to:
  perform a second plurality of one or more operations associated with the shutdown procedure based at least in part on receiving the shutdown command.

22. The non-transitory computer-readable medium of claim 21, wherein the second plurality of one or more operations comprises a flag plurality operation, a system information flush operation, a log save operation, a power down operation, or any combination thereof.

23. A method, comprising:
  receiving, by one or more memory devices, a plurality of commands from a host device, the plurality of commands comprising a first quantity of commands;
  comparing the first quantity of commands to a threshold associated with a pattern of the received plurality of commands;
  determining whether the plurality of commands are associated with a shutdown procedure based at least in part on the first quantity of commands satisfying the threshold associated with the pattern;
  initiating one or more operations associated with the shutdown procedure based at least in part on identifying that the plurality of commands are associated with the shutdown procedure; and
  receiving a shutdown command for the shutdown procedure after initiating the one or more operations associated with the shutdown procedure.

* * * * *